March 19, 1968 D. E. SAFFORD 3,374,136
METHOD OF FORMING A STORAGE CONTAINER
Filed July 29, 1964
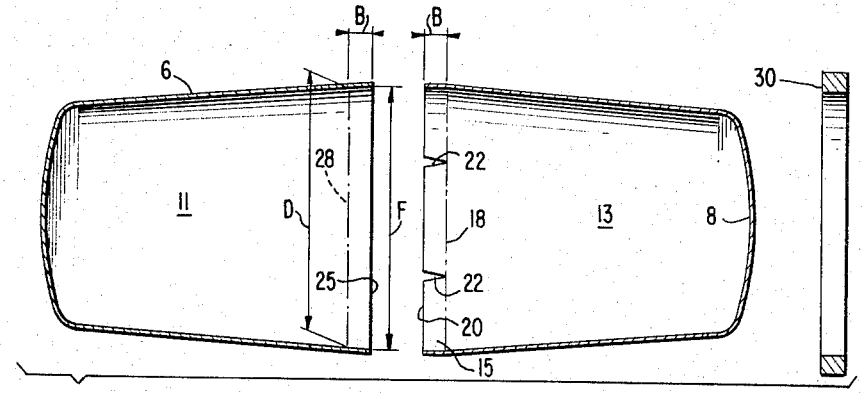
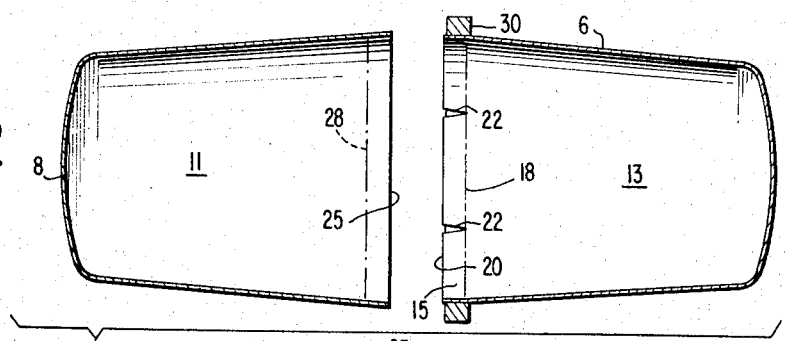
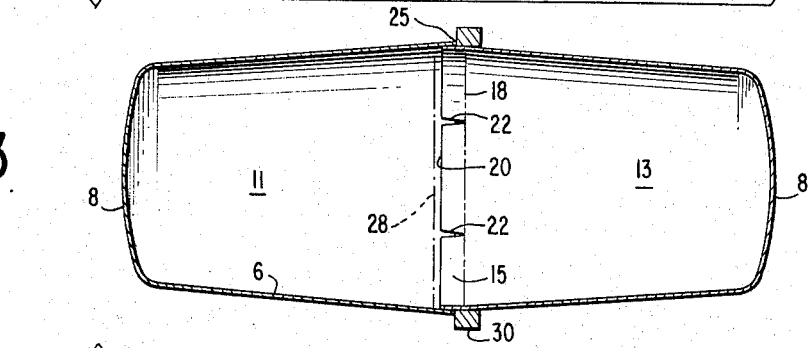
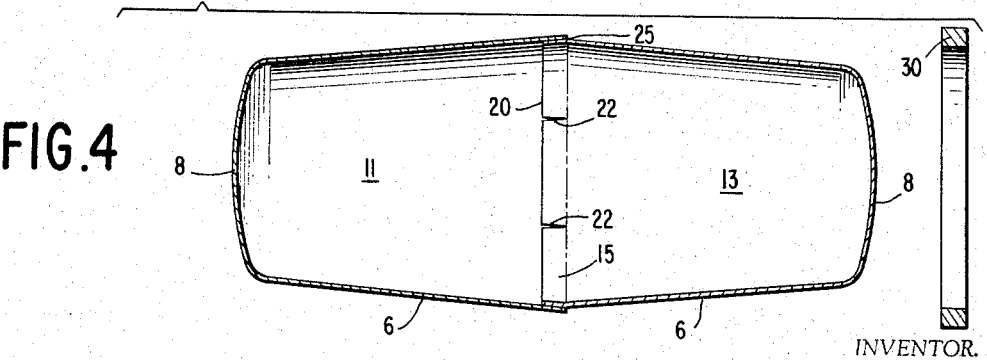
INVENTOR.
BY DONALD E. SAFFORD
McLean and Dibble
ATTORNEYS

United States Patent Office 3,374,136
Patented Mar. 19, 1968

3,374,136
METHOD OF FORMING A STORAGE CONTAINER
Donald E. Safford, Park Forest, Ill., assignor to Sinclair Research, Inc., New York, N.Y., a corporation of Delaware
Filed July 29, 1964, Ser. No. 385,892
6 Claims. (Cl. 156—293)

ABSTRACT OF THE DISCLOSURE

A method of forming a storage tank by joining two essentially mirror image hollow conical sections, in which notches are removed from the lip of one of the sections and a compression ring is then applied around that notch lip to reduce its circumference. The notched lip is then inserted within the lip of the other section, displacing the compression ring.

---

This invention relates to a novel method for coupling rigid tubular bodies; in particular, for joining truncated conical sections to produce a fluid-tight seam. The method is of special applicability in the manufacture of storage tanks, especially those slightly resilient tanks made of a fiber-reinforced rigid thermosetting synthetic resin.

Glass fiber tanks have proven to be increasingly popular for the storage of fluent materials, especially of somewhat chemically reactive liquids. Such tanks are usually assembled from two truncated cone sections, the sections themselves usually having been molded from a synthetic resin containing glass fibers and thermoset in the mold. The truncated cone shape provides for nesting of the tank halves before assembly and egg-shaped ends are often preferred for strength. The resins are usually of the phenol-aldehyde, urethane or epoxy types and the resulting cone sections have a good deal of rigidity and chemical inertia deriving from the resin employed, along with good strength characteristics derived from the glass or other mineral fiber reinforcement, as well as the shape of the tank.

Present methods used for joining the tank or other section halves require a coupling to be installed inside the tank halves and each half fastened, usually by an adhesive, to the coupling member. Due to the design of the coupling, two joints must be made—one in each half of the tank. This not only is time consuming, but also doubles the possibility of leaks and loss of strength. Further, a leading manufacturer of the glass fiber molded sections feels that the criticality of this joint requires such skill and carefully controlled conditions that it cannot be made in the field, but must be made in the factory, requiring a more elaborate shipping technique and greater shipping expense for the fully assembled tank and, of course, limiting the tank size to interstate freight specifications.

In this invention, an overlap-type connection is made between conical sections which may be of similar or only slightly different configurations at the base of the cones. The invention is applicable not only to closed full or truncated cones but also to open-ended frustums of cones which may be joined to form an irregular cylindrical device.

In this invention the side of one cone near the base to be joined to the base of another cone is scored and cut to provide a plurality of notches having converging sides. In a preferred embodiment, the side to be scored is provided as a straight cylindrical integral extension of the cone which more or less defines the internal overlap portion. The notches are sufficient in size and number to provide an outside circumference, exclusive of the material removed in the notches, equal to or less than the inside diameter of the other cone at the end of the overlap portion, that is, at a distance upward from the base about equal to the height of the triangle.

After the notches are formed, a temporary compression band is applied around the outside of the notched-end overlap portion to compress this diameter for easy assembly into the larger half. The mode by which the halves are fastened to each other may depend upon the material of which the halves are made. While welding or brazing can be used in the case of metallic tanks, thermoplastic resin materials may be heated for bonding. More usually, a proper bonding cement is applied to the mating surfaces, or at least to the inner surface of the unscored half, and the two halves pushed together. As the two halves are mated, the temporary clamping band is removed and the assembly completed. After curing of the joint, the assembled tank is ready for installation and use.

The invention will be better understood by reference to the accompanying drawing in which the figures are lateral cross-sections of the elements at various stages of assembly.

FIGURE 1 shows the elements used in the coupling after scoring of one of the tank halves;
FIGURE 2 shows the elements with the compression ring applied to the scored end;
FIGURE 3 shows the tank with the scored end partially inserted in the unscored end and
FIGURE 4 shows the completed tank.

The sections to be joined comprise conical side portions 6 which have end portions 8. The two halves, 11 and 13 as can be seen, are, in general, substantially mirror-images of each other. In the modification shown, half 13 is provided with straight cylindrical lip or overlap portion 15 which is integrally joined to the base of cone 13 at dashed line 18. Lip 15 has a length about equal to distance B between line 18 and edge 20.

As is apparent from the drawings, notches 22 are formed in lip 15, and are somewhat triangular in form having converging sides. The height of each triangle is about equal to the length of lip 15, that is, about equal to the dimension B, that is, overlap distance, from edge 20 to line 18.

A distance equal to about B may be marked off above lip 25 of other cone 11, and this overlap distance designated by the dashed line 28. The internal diameter of the cone 11 at the line 28 may be designated as dimension D, while inside diameter of cone 11 at its lip 25 may be designated by the dimension F. This inner dimension F will also usually equal the outer diameter of cone 13 at line 18. Notches 22 each have a base such that the total length of the cut-out portions reduces dimension F to about dimension D. The inside diameter of compression ring 30 also is about equal to dimension F.

In the method of this invention, after the half 13 is scored with notches 22, compression ring 30 is applied over overlap portion 15 as shown in FIGURE 2. Adhesive is applied to the inner surface of half 11, at least to the overlap portion between lip 25 and line 28. The halves are then pushed together as shown in FIGURE 3, lip 25 serving to displace compression ring 30 as portion 15 fits within the inside of half 11. Insertion of portion 15 is continued at least until edge 20 reaches line 28. The adhesive is then allowed to set, perhaps being heated, etc., to promote setting.

It can thus be seen that the method of this invention permits the fabrication of storage tanks, or other containers or conduits from truncated conical sections with but one seam.

It is claimed:
1. A method of forming a storage container by joining first and second essentially mirror-image hollow conical sections, each section having a lip adjacent its edge, said method comprising removing notches from the lip of said first section, applying a compression ring around said notched first section lip to reduce the circumference of said first section lip, and inserting said first section lip within said second section lip while displacing the compression ring.

2. The method of claim 1 further comprising the step of applying adhesive to the interior of said second section of heating said lips after inserting.

3. The method of claim 1 further comprising the step of heating said lip after inserting.

4. The method of claim 2 further comprising the step of heating said lips after inserting.

5. A method of forming a container comprising removing notches from the lip of a first hollow body, applying a compression ring around said notched lip to reduce the circumference of said notched lip, and inserting said notched lip within the lip of a second hollow body while displacing the compression ring.

6. A method of forming a container comprising removing notches from the lip of a first hollow conical body, applying a compression ring around said notched lip to reduce the circumference of said notched lip, and inserting said notched lip within the lip of an essentially mirror-image hollow conical body while displacing the compression ring.

References Cited

UNITED STATES PATENTS

| | | | |
|---|---|---|---|
| 2,930,634 | 3/1960 | Merritt | 285—21 |
| 3,053,726 | 9/1962 | Larson et al. | 156—304 |
| 3,239,397 | 3/1966 | Hoyle | 156—293 X |

EARL M. BERGERT, *Primary Examiner.*

HAROLD ANSHER, *Examiner.*

UNITED STATES PATENT OFFICE
CERTIFICATE OF CORRECTION

Patent No. 3,374,136   March 19, 1968

Donald E. Safford

It is certified that error appears in the above identified patent and that said Letters Patent are hereby corrected as shown below:

Column 3, line 8, cancel "of heating said lips after inserting." and insert -- lip before inserting. --; line 10, "lip" should read -- lips --.

Signed and sealed this 23rd day of September 1969.

(SEAL)
Attest:

Edward M. Fletcher, Jr.
Attesting Officer

WILLIAM E. SCHUYLER, JR.
Commissioner of Patents